United States Patent
Vajapeyam

(10) Patent No.: US 9,864,709 B2
(45) Date of Patent: Jan. 9, 2018

(54) DATA TRANSFER IN A MULTI-CORE PROCESSOR

(71) Applicant: Empire Technology Development LLC, Wilmington, DE (US)

(72) Inventor: Sriram Vajapeyam, Karnataka (IN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 314 days.

(21) Appl. No.: 14/383,895

(22) PCT Filed: Nov. 21, 2013

(86) PCT No.: PCT/US2013/071303
§ 371 (c)(1),
(2) Date: Sep. 8, 2014

(87) PCT Pub. No.: WO2015/047427
PCT Pub. Date: Apr. 2, 2015

(65) Prior Publication Data
US 2015/0286597 A1    Oct. 8, 2015

(30) Foreign Application Priority Data
Sep. 30, 2013 (IN) .......................... 4449/CHE/2013

(51) Int. Cl.
*G06F 3/00*     (2006.01)
*G06F 13/36*    (2006.01)
(Continued)

(52) U.S. Cl.
CPC ............ *G06F 13/28* (2013.01); *G06F 12/084* (2013.01); *G06F 12/0817* (2013.01); *G06F 2212/62* (2013.01); *G06F 2212/622* (2013.01)

(58) Field of Classification Search
CPC ............... G06F 17/30171; G06F 9/526; G06F 17/30362
(Continued)

(56) References Cited

U.S. PATENT DOCUMENTS 5,493,668 A * 2/1996 Elko .................. G06F 12/0868
                                                711/113
6,128,677 A * 10/2000 Miller ................ G06F 13/4031
                                                710/107
(Continued)

OTHER PUBLICATIONS

"ARM Synchronization Primitives," Development Article, pp. 1-28, (2009).
(Continued)

*Primary Examiner* — Faisal M Zaman
(74) *Attorney, Agent, or Firm* — Turk IP Law, LLC

(57) ABSTRACT

Techniques described herein are generally related to data transfer in multi-core processor devices. A core of a multi-core processor device may be configured to receive a request for a data block, which may be stored in a private cache of the core. The data block in the private cache may be evaluated by a coherence module of the core to determine when the data block is in a ready state. A program slice associated with the data block may be identified by the coherence module when the data block is determined to be in an unavailable state and the identified program slice may be executed by the core to update the data block from the unavailable state to the ready state. The data block may be sent to an interconnect network in response to the received request when the stored data block is determined to be in the ready state.

18 Claims, 6 Drawing Sheets

(51) Int. Cl.
G06F 13/28 (2006.01)
G06F 12/084 (2016.01)
G06F 12/0817 (2016.01)

(58) Field of Classification Search
USPC .................................................. 710/5, 308
See application file for complete search history.

(56) References Cited

U.S. PATENT DOCUMENTS

| | | | |
|---|---|---|---|
| 6,349,350 B1* | 2/2002 | Hathorn | G06F 11/1443 709/238 |
| 6,487,652 B1* | 11/2002 | Gomes | G06F 9/52 712/23 |
| 6,691,206 B1 | 2/2004 | Rubinstein | |
| 7,062,582 B1* | 6/2006 | Chowdhuri | G06F 13/364 370/462 |
| 2005/0086439 A1* | 4/2005 | Kaczynski | G06F 9/52 711/151 |
| 2005/0102565 A1* | 5/2005 | Barr | G06F 11/2242 714/25 |
| 2006/0143610 A1* | 6/2006 | Toader | G06F 9/524 718/100 |
| 2007/0271450 A1 | 11/2007 | Doshi et al. | |
| 2009/0083493 A1* | 3/2009 | Kinter | G06F 12/0831 711/141 |
| 2009/0083497 A1* | 3/2009 | Yu | G06F 12/0842 711/144 |
| 2009/0198933 A1* | 8/2009 | Arimilli | G06F 9/526 711/163 |
| 2010/0042870 A1* | 2/2010 | Amatsubo | G06F 9/526 714/10 |
| 2010/0180101 A1 | 7/2010 | Trumler et al. | |
| 2010/0299481 A1 | 11/2010 | Conte et al. | |
| 2011/0010709 A1 | 1/2011 | Anand et al. | |
| 2011/0153724 A1* | 6/2011 | Raja | H04L 67/325 709/203 |
| 2011/0154368 A1* | 6/2011 | Banks | G06F 9/526 719/316 |
| 2011/0173394 A1 | 7/2011 | Gara et al. | |
| 2011/0197195 A1 | 8/2011 | Cai et al. | |
| 2012/0042133 A1 | 2/2012 | Takeda et al. | |
| 2013/0086348 A1* | 4/2013 | Marathe | G06F 9/467 711/163 |
| 2013/0179666 A1 | 7/2013 | Yamashita et al. | |
| 2013/0247060 A1* | 9/2013 | Makljenovic | G06F 9/526 718/104 |
| 2013/0318350 A1* | 11/2013 | Nakano | H04L 9/0841 713/168 |
| 2014/0351825 A1* | 11/2014 | Xu | G06F 9/526 718/106 |
| 2015/0149735 A1* | 5/2015 | Nale | G06F 11/079 711/147 |

OTHER PUBLICATIONS

"Coupling Facility," accessed at http://en.wikipedia.org/wiki/Coupling_Facility, Accessed on Aug. 18, 2014, pp. 3.
"Intel Architecture Instruction Set Extensions Programming Reference," Intel Corp., pp. 1-598, (2012).
"On the Advantages of Tagged Architectures," IEEE Transactions on Computers, vol. C-22, No. 7, pp. 643-656, Jul. 1973.
Alto, P., "HP Collaborates with Hynix to Bring the Memristor to Market in Next-generation Memory," accessed at http://www8.hp.com/us/en/hp-news/press-release.html?id=595678#.U__HOzuOSwdQ, accessed on Aug. 18, 2014, pp. 2.
Alto, P., "HP Labs Discovery Holds Potential to Fundamentally Change Computer System Design," Accessed at http://www8.hp.com/us/en/hp-news/press-release.html?id=595678#.U__HOzuOSwdQ, Accessed on Aug. 18, 2014 pp. 2.
Bright, P., "IBM's new transactional memory: make-or-break time for multithreaded revolution," accessed at http://web.archive.org/web/20131118234914/http://arstechnica.com/gadgets/2011/08/ibms-new-transactional-memory-make-or-break-time-for-multithreaded-revolution/, accessed on Aug. 18, 2014, pp. 4.
Chua, L., "Memristor," Wikipedia, accessed at http://web.archive.org/web/20131107044347/http://en.wikipedia.org/wiki/Memristor, accessed on Aug. 18, 2014, pp. 24.
Haring, R., "The Blue Gene/Q Compute Chip", Ruud Haaring, Hot Chips Symposium, 2011, pp. 1-20, Aug. 18, 2011.
Kamruzzaman, M. et al., "Software Data-Spreading: Leveraging Distributed Caches to Improve Single Thread Performance," Proceedings of the 2010 ACM SIGPLAN conference on Programming language design and implementation, vol. 45, No. 6, pp. 460-470, (2010).
Kamruzzaman, M.,et al., "Inter-core Prefetching for Multicore Processors Using Migrating Helper Threads," Int'l Conference on Architectural Support for Operating Systems and Programming Languages (ASPLOS), pp. 1-12, Mar. 5, 2011.
Kim, D. and Yeung, D., "Design and Evaluation of Compiler Algorithm for Pre-Execution," Proceedings of the International Conference on Architectural Support for Programming Languages and Operating Systems (ASPLOS), pp. 159-170, Oct. 2002.
Kyne, F., et al.,"Coupling Facility Performance:A Real World Perspective," An IBM Red paper publication, pp. 1-56, Mar. 2006.
Quinones, C. G, et al., "Mitosis Compiler: An Infrastructure for Speculative Threading based in Pre-Computation Slices," ACM SIGPLAN Conference on Programming Language Design and Implementation, pp. 1-11, (2005).
Rajwar, R., and Godman, J. R, "Speculative Lock Elision: Enabling Highly Concurrent Multithreaded Execution," 34th International Symposium on Microarchitecture (MICRO), pp. 1-12, Dec. 3-5, 2001.
Reinders, J., "Coarse-grained Locks and Transactional Synchronization Explained," Accessed at http://web.archive.org/web/20131017090414/http://software.intel.com/en-us/blogs/2012/02/07/coarse-grained-locks-and-transactional-synchronization-explained, Accessed on Aug. 18, 2014, pages.
Reinders, J., "Transactional Synchronization in Haswell", accessed at http://web.archive.org/web/20131024223806/http://software.intel.com/en-us/blogs/2012/02/07/transactional-synchronization-in-haswell/, accessed on Aug. 18, 2014, pp. 4.
Silbert, S., "Microsoft joins Hybrid Memory Cube Consortium to develop new DRAM standard," accessed at http://web.archive.org/web/20130829215507/http://www.engadget.com/2012/05/09/microsoft-joins-hybrid-memory-cube-consortium/, accessed on Aug. 18, 2014, pp. 2.
Treleaven, P.C. et al., "Data-Driven and Demand-Driven Computer Architecture," ACM Computing Surveys, vol. 14, No. 1, pp. 93-143, Mar. 1982.
Zhang, W, et al., "Accelerating and Adapting Pre-Computation Threads for Efficient Pre-Fetching," Proceedings of the 2007 IEEE 13th International Symposium on High Performance Computer Architecture, pp. 85-95, (2007).
Zhou, P., "MRAC: A Memristor-based Reconfigurable Framework for Adaptive Cache Replacement," IEEE Computer Society, pp. 207-208 (2011).
International Search Report and Written Opinion for PCT/US2013/071303 filed Nov. 21, 2013 and dated Jun. 27, 2014.
"HP Labs Discovery Holds Potential to Fundamentally Change Computer System Design—"Memristor" could enable computation on memory chips," accessed at http://h30261.www3.hp.com/news-and-events/news-library/2010/08-04-2010.aspx, Apr. 8, 2010, pp. 4.
A Revolution in Memory, accessed at http://www.micron.com/products/hybrid-memory-cube/all-about-hmc, accessed on Aug. 18, 2014, Micron Technology, Inc, pp. 1-2 (2014).

* cited by examiner

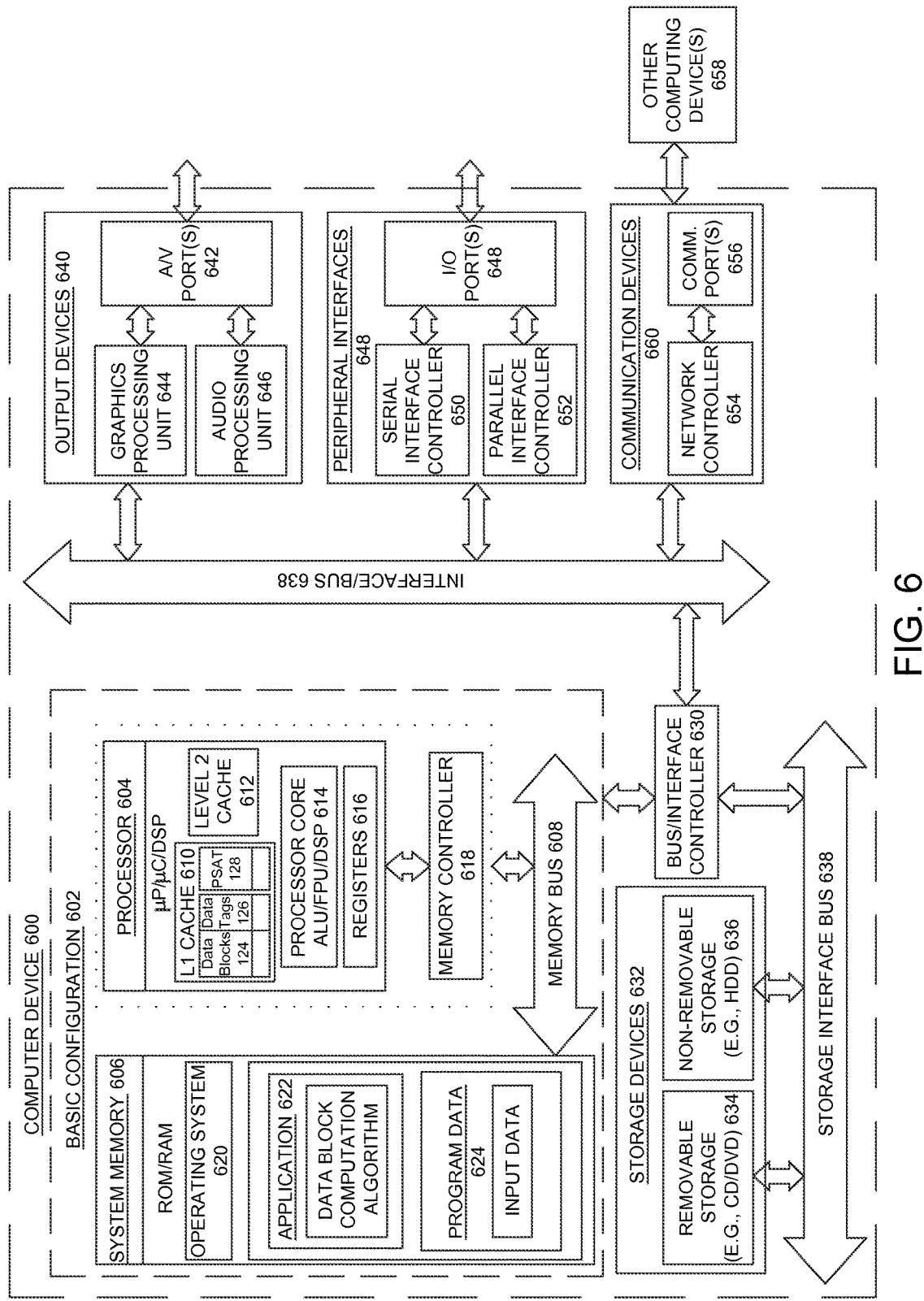

DATA TRANSFER IN A MULTI-CORE PROCESSOR

CROSS-REFERENCE TO RELATED APPLICATIONS

This Application is U.S. National Stage filing under 35 U.S.C. §371 of International Application No. PCT/US13/71303 flied on Nov. 21, 2013, which claims priority under PCT Article 8 and/or 35 U.S.C. §119(a) to Indian Application No. 4449/CHE/2013 Filed on Sep. 30, 2013. The disclosures of International Application No. PCT/US13/71303 and Indian Application No. Indian 4449/CHE/2013 are hereby incorporated by reference in their entireties.

Unless otherwise indicated herein, the approaches described in this section are not prior art to the claims in this application and are not admitted to be prior art by inclusion in this section.

Modern computing systems often utilize multi-core processors having two or more processor cores interfaced for enhanced performance and efficient processing of multiple tasks or threads. Coordination and synchronization across processor cores are activities that can be critical in multi-core processors. In some examples, a compiler or a programmer may identify program points that may potentially need coordination and synchronization across multiple threads and/or multiple cores. Such program points may be identified without prior knowledge of runtime behavior of the program. Some coordination and synchronization activities may be tedious and may result in overhead costs. As the number of processor cores increases, the overhead costs of such activities may increase and thus may result in limiting the overall performance of the parallel architecture.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

Techniques described herein are generally related to data transfer in multi-core processor devices. The various described techniques may be applied to methods, systems, devices or combinations thereof. Some described multi-core processor devices may include a first core configured to receive a request for data block. The first core may include a private cache and a coherence module. The private cache may be configured to store the data block. The coherence module may be configured to determine when the data block stored in the private cache is in a ready state. When the data block is determined to be in an unavailable state, a program slice associated with the data block may be identified by the coherence module. The identified program slice may be executed by one of more processor units of the multi-core processor devices and the data block may be updated from the unavailable state to the ready state.

According to some examples of the present disclosure, various methods related to data transfer in a multi-core processor device are described. Some example methods may include receiving a request for a data block by a first core of the multi-core processor device, where the data block may be stored in a private cache of the first core. The data block in the private cache can be evaluated to determine when the stored data block is in a ready state. A program slice associated with the data block may be identified when the stored data block is determined to be in an unavailable state and the identified program slice may be executed by the first core effective to update the stored data block from the unavailable state to the ready state. The data block may be sent to an interconnect network in response to the received request when the stored data block is determined to be in the ready state.

According to some examples of the present disclosure, various methods related to data transfer in a multi-core processor device are described. Some example methods may include receiving a request for data block by a first core of the multi-core processor device, where the data block may be stored in a private cache of the first core. The data block in the private cache can be evaluated by a coherence module of the first core to determine when the stored data block is in a ready state. A program slice associated with the data block may be identified by the coherence module when the stored data block is determined to be in an unavailable state and the identified program slice may be executed by the first core effective to update the stored data block from the unavailable state to the ready state. The data block may be sent by the first core to an interconnect network in response to the received request when the stored data block is determined to be in the ready state.

According to additional examples of the present disclosure, multi-core processor devices are described. Some described multi-core processor devices may include a first core configured to receive a request for data block. The first core may include a private cache and a coherence module. The private cache may be configured to store the data block. The coherence module may be configured to determine when the data block stored in the private cache is in a ready state. The coherence module may be further configured to identify a program slice associated with the data block when the data block is determined to be in an unavailable state. The multi-core processor device may also include one or more processor units configured to execute the identified program slice to update the data block from the unavailable state to the ready state.

According to still further examples of the present disclosure, additional methods related to data transfer in a multi-core processor device are described. Some example methods may include receiving a request for data block by a first core of the multi-core processor device. The data block may be stored in a private cache of the first core. A ready bit associated with the data block may be evaluated by a coherence module of the first core to determine when the data block is in a ready state in the private cache. A program slice may be identified by a pointer field associated with the data block by the coherence module when the data block is determined to be in an unavailable state. The identified program slice may be executed by the first core effective to update the data block from the unavailable state to the ready state, and the data block may be sent to a second core in response to the received request after the stored data block is updated to the ready state.

Figure 1:
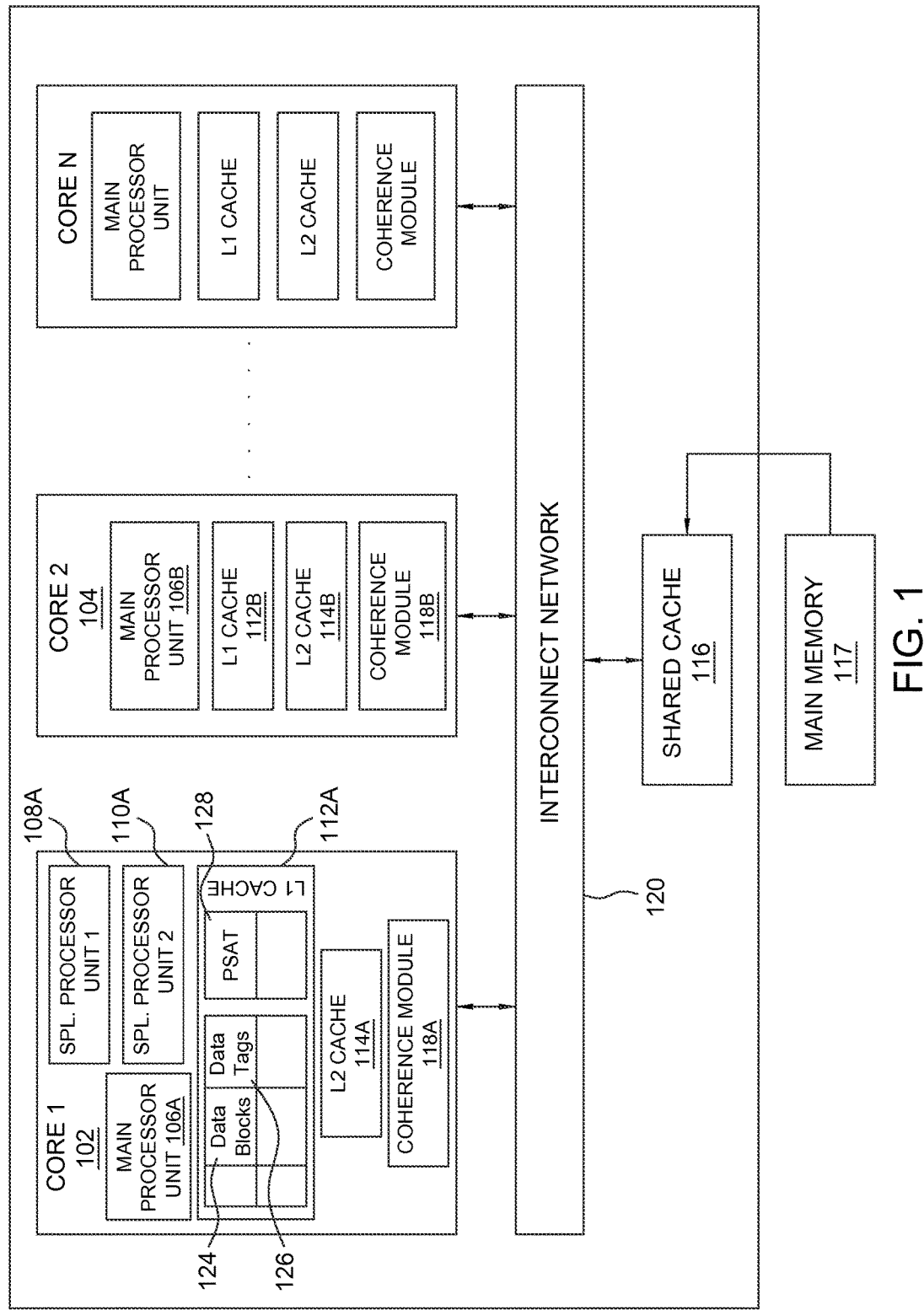
FIG. 1 is a schematic diagram illustrating components of an example multi-core processor device.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Example embodiments of the present disclosure are generally directed to techniques for data transfer in multi-core processor devices. The techniques may facilitate operations such as coordination or synchronization across multiple cores of such multi-core processor devices. In some example embodiments, the multi-core processor devices may include cached memory locations that may be associated with program slices, where the program slices may be used to facilitate activities such as synchronization, coordination, value production, value pre-fetch, etc. Moreover, cache lines for caches of the multi-core processors may include tags to indicate the state of the corresponding cache lines. For example, the tags associated with the cache lines may be evaluated to determine when the cache lines are in an unavailable state and a ready state. Tags may also be used to trigger execution of one or more program slices associated with the corresponding cache lines to facilitate the synchronization, coordination, and other operations.

FIG. 1 is a schematic diagram illustrating components of an example multi-core processor device 100 arranged in accordance with at least some embodiments of the present disclosure. The multi-core processor device 100 may be a general-purpose processor, a special-purpose processor, an application specific processor, an embedded processor, a graphics processor, or the like. The multi-core processor device 100 may include a plurality of cores such as a first core 102 and a second core 104. Potentially, the number (N) of cores may be any number greater than one. Each of the cores (such as the first core 102 and the second core 104) includes internal functional blocks.

Each of the cores such as the first core 102 and the second core 104 may include one or more processor units. For example, the first core 102 may include a main processor unit 106A and the second core 104 may include a main processor unit 106B. The first core 102 may further include one or more special purpose processor units such as represented by reference numerals 108A and 110A. In another example, the first core 102 may include additional processor units such as a reprogrammable processor unit (not shown).

Each of the cores may further include one or more caches. For example, the first core 102 may include a private cache such as a level 1 (L1) cache 112A. Similarly, the second core 104 may include a level 1 (L1) cache 112B. In some examples, each of the cores may further include one or more additional private caches. For example, the first core 102 may include a level 2 (L2) cache 114A and the second core 104 may include a L2 cache 114B. In addition, the first core 102 and the second core 104 may be associated with a shared cache 116. The shared cache 116 may be coupled to a main memory 117 of a computing device that incorporates the multi-core processor device 100. Each of the first core 102 and the second core 104 may include a coherence module, represented by reference numerals 118A and 118B respectively. The coherence modules 118A and 118B may be configured to facilitate state coherence across the cores. The coherence module 118B of the second core 104 may be configured to send a state coherence request to the coherence module 118A of the first core 102 over an interconnect network 120. The interconnect network 120 may be a shared bus, a circuit-switched network-on-chip (NoC), a packet-switched network-on-chip (NoC), a crossbar interconnect, a mesh interconnect network, a ring interconnect network, among others.

In this example, the L1 cache 112A of the first core 102 may be configured to store one or more data blocks generally represented by reference numeral 124. During operation of the multi-core processor device 100, one or more program slices (not shown) may be associated with the data blocks 124. The program slices may correspond to a subset of instructions of a program that may be executed by the multi-core processor device 100, where the program slices may be defined using any variety of techniques. For example, program slices may be identified for pre-fetching certain memory locations in the multi-core processor device 100. For example, in certain systems, a program dependence graph (PDG) may be used to identify one or more instructions of the program that may affect the value of a variable. In some examples, runtime software and/or hardware may construct program slices and instructions that may be associated with the data blocks 124.

Program slices may facilitate operations such as synchronization, coordination, value production, and value pre-fetch, among others. In some examples, the program slice may be a static program slice that may be determined by a compiler. In other examples, the program slice may be a dynamic program slice identified during execution of the program by the multi-core processor device 100.

In some examples, the L1 cache 112A may include a plurality of data tags 126, where each tag is associated with the data blocks 124. The data tags 126 may be indicative of a status of the data blocks 124. Example data tags 126 may include, a ready bit, a respond-immediately bit, a pinned bit, a pointer field, or combinations thereof. The data tags 126 will be described in detail below with reference to FIG. 2.

The L1 cache 112A may also include a program slice address table (P-SAT) 128 that may be configured to store one or more entries corresponding to addresses of program slices associated with the data blocks 124. In one example, the P-SAT 128 may be stored in a private cache such as the L1 cache 112A of the first core 102. In some examples, the P-SAT 128 may be stored in alternate locations such as in a separate hardware table. The coherence module 118A of the first core 102 may be configured to identify the associated program slice for the data blocks 124 from the program slice address table (P-SAT) 128. In some examples, the coherence module 118A may perform such identification based upon an evaluation of a pointer field in the data tags 126 that is associated with the data block 124. In some examples, entries of the P-SAT 128 may be loaded into a program counter (not shown) of the first core 102.

In various examples, the program slice may include one or more instructions. Further, the end of the program slice may be represented by a special STOP instruction, or by a branch instruction that returns execution control back to the operating system, or by an instruction that may be used to indicate completion of a execution of a thread/process. The STOP or the branch instructions may indicate that the execution of the program slice is completed. Upon completion, the processor may switch to the operating system or may continue the execution of the program.

It is noted that although various examples are described with reference to two cores, the described techniques may be applicable to data transfer across more than two cores.

During operation, the first core 102 may receive requests for data blocks 124 from other cores, such as the second core 104 of the multi-core processor 100. In some examples, the requests for data blocks may be received by the coherence module such as the coherence module 118A of the first core 102. The coherence module 118A of the first core 102 may be configured to determine when the requested data block 124 is stored in the private cache such as the L1 cache 112A. The coherence module 118A may also be configured to determine when the requested data block 124 is in a ready state. The coherence module 118A may be further configured to identify one or more program slices associated with the requested data block 124. In some examples, such program slices may be identified when the coherence module 118A determines that the requested data block 124 is in an unavailable state. In some examples, the data block in an unavailable state may refer to a cache line that may not be currently available to be sent to a requesting core. In some examples, such data block may be available to be sent to the requesting core upon execution of one or more associated program slices. The coherence module 118A may be configured to identify the associated program slice from the P-SAT 128 based upon evaluation of the pointer field associated with the data tag 126 that corresponds to the requested data block 124.

In this example, processor units such as the main processor unit 106A, and special processor units 108A and 110A of the first core 102 may be configured to execute the identified program slices. Execution of the program slices by the processor units of the first core 102 may update the data blocks 124 from the unavailable state to the ready state. The processor units of the first core 102 may execute the program slices to perform one or more of data block computation, data block fetch, data coordination, and data synchronization operations.

In some examples, the data blocks may be computed by execution of the identified program slices and the state of the data blocks 124 may be updated from the unavailable state to the ready state when the identified program slices have computed the data blocks. Further, the data blocks 124 in the ready state may be sent by the coherence module 118A to the requesting core (such as the second core 104) over the interconnect network 120. In some other examples, the processor units such as the special processor units 108A and 110A may be configured to obtain the data blocks 124 from pre-determined linked memory locations. For example, the special processor unit 108A may obtain the data block 124 from the main memory 117, and may also initiate pre-fetch of other required data blocks in the main memory 117. In some examples, the one or more processor units may be configured to execute a cache coherence protocol for requested data blocks 124.

It should be noted that the above arrangement of the components is purely illustrative and a variety of other arrangements and components may be envisaged. The present technique may be applicable to multi-core processors with different configurations of local and shared caches to store data. For example, at least two cores may be associated with a shared on-chip cache selected from the plurality of on-chip caches of the multi-core processor device 100. In some examples, additional cache levels may be provided such as an L3 cache. In some examples, a single L1 cache may be provided in each core. In some other examples, a single L1 cache along with a L2 cache, with the cache coherence logic associated with only the L2 cache, may be provided in each core.

Figure 2:
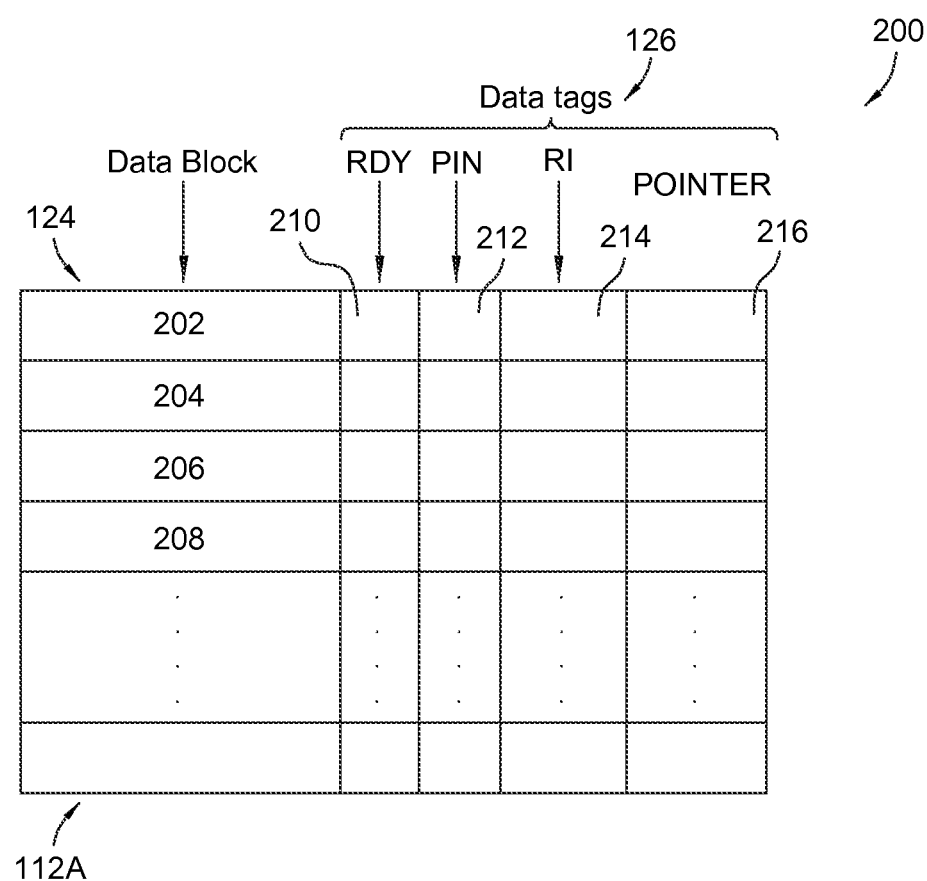
FIG. 2 illustrates an example representation of entries of an example private cache, such as a level one (L1) cache of a core of the multi-core processor device of FIG. 1.

FIG. 2 illustrates an example representation of entries of an example private cache, such as the L1 cache 112A of the first core 102 of the multi-core processor device 100 of FIG. 1, arranged in accordance with at least some embodiments described herein. In this example, the L1 cache 112A may include one or more data blocks (generally represented by reference numeral 124) and data tags 126 associated with the one or more data blocks 124. In various embodiments, one or more data blocks (such as represented by reference numerals 202, 204, 206 and 208) stored in the L1 cache 112A may be associated with a corresponding data tag. For example, for the data block 202, the corresponding data tag may include a ready (RDY) bit 210, a pinned (PIN) bit 212, a respond-immediately (RI) bit 214 and a pointer field 216.

The ready (RDY) bit 210 may contain a value indicative of whether a data block (e.g., the data block 202) stored in the private cache (e.g., L1 cache 112A) is in a ready state. A data block 202 determined to be in a ready state may be available to be sent to a requesting core (e.g., core 104). Further, a value of the pinned (PIN) bit 212 of the data block 202 may be evaluated by the coherence module (e.g., coherence module 118A) to determine when the data block 202 is pinned to the private cache 112A of the first core 102. When the data block 202 is determined to be pinned to the private cache 112A (for example, when the pinned (PIN) bit 212 is SET), eviction of the data block 202 from the private cache 112A may be prevented by the coherence module 118A. In one example, when it is determined that the data block 202 is pinned and the ready bit 210 is not SET, the coherence logic may withhold responding to the remote request until the ready bit 210 is SET. The coherence logic may trigger execution of the program slice associated with the data block 202 and may update the ready bit 210 once the data block 202 is computed by associated program slice.

In some examples, a value of the respond-immediately (RI) bit 214 of the data block 202 may be evaluated by the coherence module 118A of the first core 102. Evaluation of the respond-immediately (RI) bit 214 may indicate (for example, when the value of the respond-immediately (RI) bit 214 is SET) that the data block 202 may be sent to the requesting core (e.g., core 104). In such examples, the data block 202 may be sent to the requesting core through the interconnect network 120. In examples where the value of the respond-immediately (RI) bit 214 is not SET, then the data block 202 may be sent to the requesting core upon completion of execution of an associated program slice. In other examples, when the ready (RDY) bit is SET and the respond-immediately (RI) bit is not SET, the coherence logic may trigger execution of the associated slice and the data block 202 may be sent to the requesting core upon completion of execution of the associated slice.

The pointer field 216 may be configured to identify a program slice associated with the data blocks (e.g., data blocks 202, 204, 206 and 208) from the program slice address table (P-SAT) 128. In some examples, one or more of the processor units (e.g., main processor unit 106A, and special processor units 108A and 110A of the first core 102) may be configured to execute the identified associated program slices to update the data blocks (e.g., data blocks 202, 204, 206 and 208) to the ready state.

Figure 3:
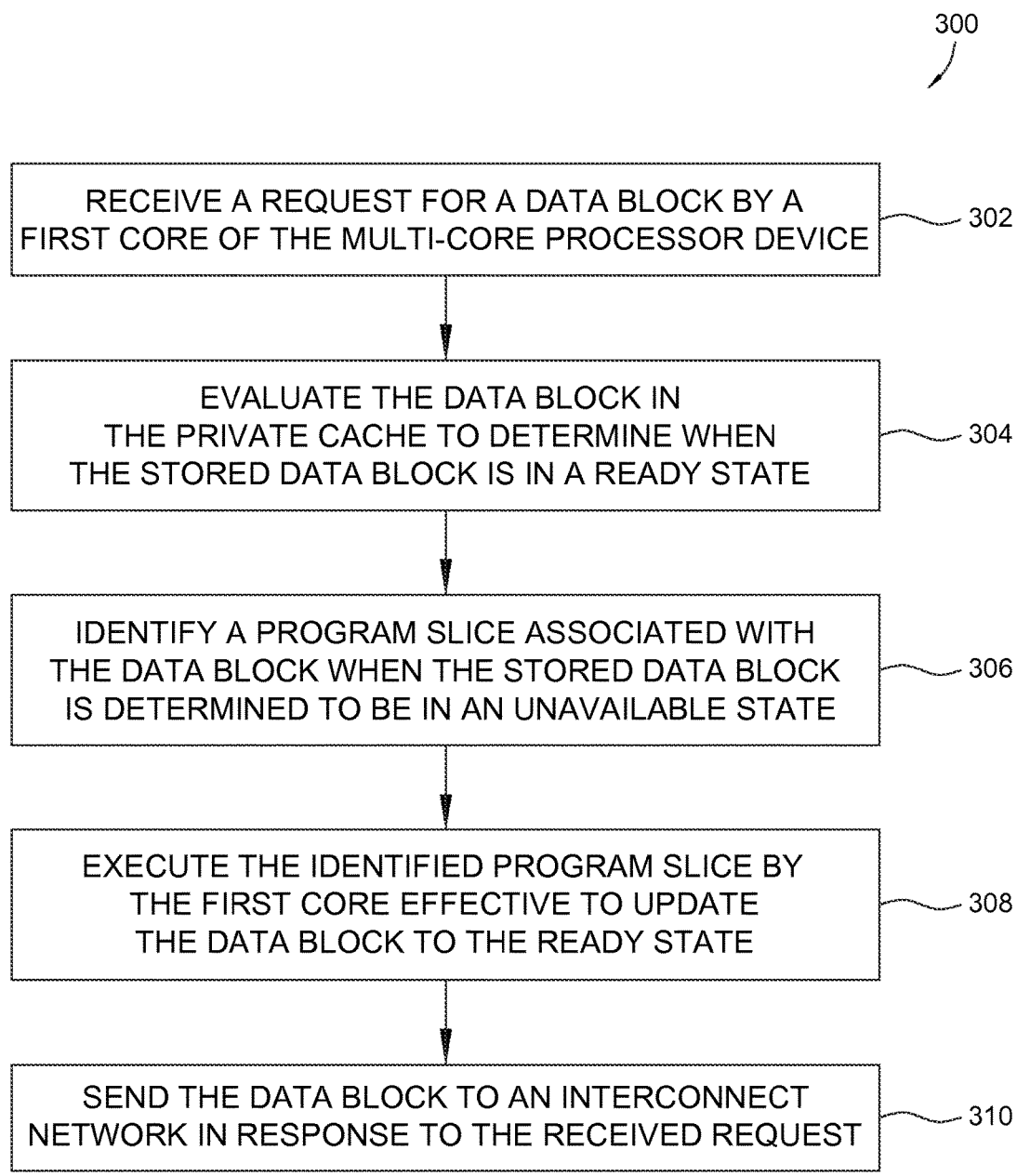
FIG. 3 is an illustration of an example process for data transfer across cores in a multi-core processor device.

FIG. 3 is an illustration of an example process 300 for data transfer across cores (e.g., the first core 102 and the second core 104) of a multi-core processor device (e.g., multi-core processor device 100 of FIG. 1), arranged in accordance with at least some embodiments described herein. Process 300 may include one or more operations, functions or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation. Process 300 may begin at block 302.

At block 302, "RECEIVE A REQUEST FOR A DATA BLOCK BY A FIRST CORE OF THE MULTI-CORE PROCESSOR DEVICE", a request for data block (e.g., data block 202) may be received by the first core (e.g., core 102) of the multi-core processor device (e.g., device 100). The data block (202) may be stored in a private cache (e.g., cache 112A) of the first core (e.g., core 102). In one example embodiment, the first core (e.g., core 102) may receive a request for the data block (202) from a second core (e.g., core 104) of the multi-core processor device (e.g., device 100) through an interconnect network (e.g., network 120).

Processing may continue from block 302 to 304, "EVALUATE THE DATA BLOCK IN THE PRIVATE CACHE OF THE FIRST CORE TO DETERMINE WHEN THE DATA BLOCK IS IN A READY STATE". At block 304, the requested data block stored in the private cache may be evaluated to determine when the data block is in a ready state. Such evaluation may be performed by the coherence module of the first core by evaluating a value of a ready bit associated with the requested data block.

For example, the data block (e.g., data blocks 202) stored in the private cache (e.g., cache 112A) of the first core (e.g., core 102) may be evaluated to determine when the stored data block (202) is in a ready state. In some examples, such evaluation may be performed by the coherence module (e.g., coherence module 118A) of the first core (e.g., core 102). In some examples, a value of a ready (RDY) bit (e.g., ready bit 210) associated with the data block (202) may be evaluated to determine when the stored data block (e.g., data block 202) is in a ready state. The value of the ready (RDY) bit (e.g., ready bit 210) may be indicative of whether the data block (e.g., data blocks 202) stored in the private cache (e.g., cache 112A) is in the ready state. When the value of the ready (RDY) bit (e.g., ready bit 210) indicates that the data block (e.g., data block 202) is in a ready state, the data block (e.g., data blocks 202) may be sent by the coherence module (e.g., coherence module 118A) of the first core (e.g., core 102) to a coherence module such as (e.g., coherence module 118B) of the requesting core (e.g., second core 104) through the interconnect network (e.g., interconnect network 120).

Processing may continue from block 304 to 306, "IDENTIFY A PROGRAM SLICE ASSOCIATED WITH THE DATA BLOCK WHEN THE STORED DATA BLOCK IS DETERMINED TO BE IN AN UNAVAILABLE STATE". At block 306, when the data block is determined to be in an unavailable state, a program slice associated with the data block may be identified. A pointer field associated with the data block may be evaluated by the coherence module of the first core to identify one or more program slices associated with the data block.

For example, when the data block (e.g., data blocks 202) is determined to be in the unavailable state, a program slice associated with the data block (e.g., data block 202) may be identified. In one example embodiment, a pointer field (e.g., pointer field 216) associated with the data block (e.g., data block 202) may be evaluated by the coherence module (e.g., coherence module 118A) of the first core (e.g., core 102) to identify the associated program slice. The identified program slice may be a static program slice or a dynamic program slice. The program slice associated with the data block (e.g., data block 202) may be identified by an entry of a program slice address table (P-SAT) (e.g., P-SAT 128) using the pointer field (e.g., pointer field 216) associated with the data block (e.g., data block 202). In some embodiments, the P-SAT (e.g., PSAT 128) may include a pointer to a logic that may be executed by a processor unit of the first core (e.g., core 102). The logic may be invoked to generate the data block (e.g., data blocks 202). In some examples, the logic may obtain the block from the main memory (e.g., memory 117). In one example, the logic may increment a value in a buffer and write the incremented value to the data block. In another example, the logic may implement a cache coherence protocol to obtain the data block from one of the caches of another core. In some other example, the logic may write into the data block a value that was pre-fetched earlier from the main memory (e.g., memory 117) or from one of the shared caches (e.g., cache 116).

Processing may continue from block 306 to 308, "EXECUTE THE IDENTIFIED PROGRAM SLICE BY THE FIRST CORE EFFECTIVE TO UPDATE THE DATA BLOCK TO THE READY STATE". At block 308, the identified program slice may be executed by a processor unit of the first core effective to update the data block to the ready state.

For example, one or more identified program slices may be executed by the first core (e.g., core 102) to update the state of data block (e.g., data blocks 202) from the unavailable state to the ready state. In some examples, the data block (e.g., data block 202) may be updated to the ready state by performing one or more of data block computation, data block fetch, data coordination, and data synchronization operations. In one example embodiment, one or more instructions that correspond to the identified program slices may be executed to write the value of the data blocks (e.g., data block 202) and update the state of the corresponding data blocks to the ready state. The identified program slice may be executed by one of a main processor unit (106A), a special purpose processor unit (e.g., 108A and 110A), or a reprogrammable processor unit (not shown) of the first core (e.g., core 102) of the multi-core processor device (e.g., multi-core processor device 100).

Processing may continue from block 308 to 310, "SEND THE DATA BLOCK TO AN INTERCONNECT NETWORK IN RESPONSE TO THE RECEIVED REQUEST". At block 310, the requested data block may be sent in response to the received request by the first core. The data block may be sent by the coherence module of the first core to the coherence module of the requesting core.

For example, the data block (e.g., data block 202) may be sent in response to the request received by the first core (e.g., core 102). The data blocks (e.g., data blocks 202) may be sent by the coherence module (e.g., coherence module 118A) to the coherence module (e.g., coherence module 118B) of the requesting core, such as the second core (e.g., core 104), through the interconnect network (e.g., network 120). In some examples, the first core (e.g., core 102) of the multi-core processor device (e.g., multi-core processor device 100) may receive a second request for the data block (e.g., data block 202). Moreover, a counter (not shown) associated with the data block (e.g., data block 202) may be incremented when the data block (e.g., data block 202) is determined to be in the unavailable state. In some examples, the counter may be maintained in a virtual memory. Further, once it is determined that the data block (e.g., data block 202) is in the ready state upon execution of the identified program slice, the second request may be processed and the data block (e.g., data block 202) may be sent to the requesting core.

Figure 4:
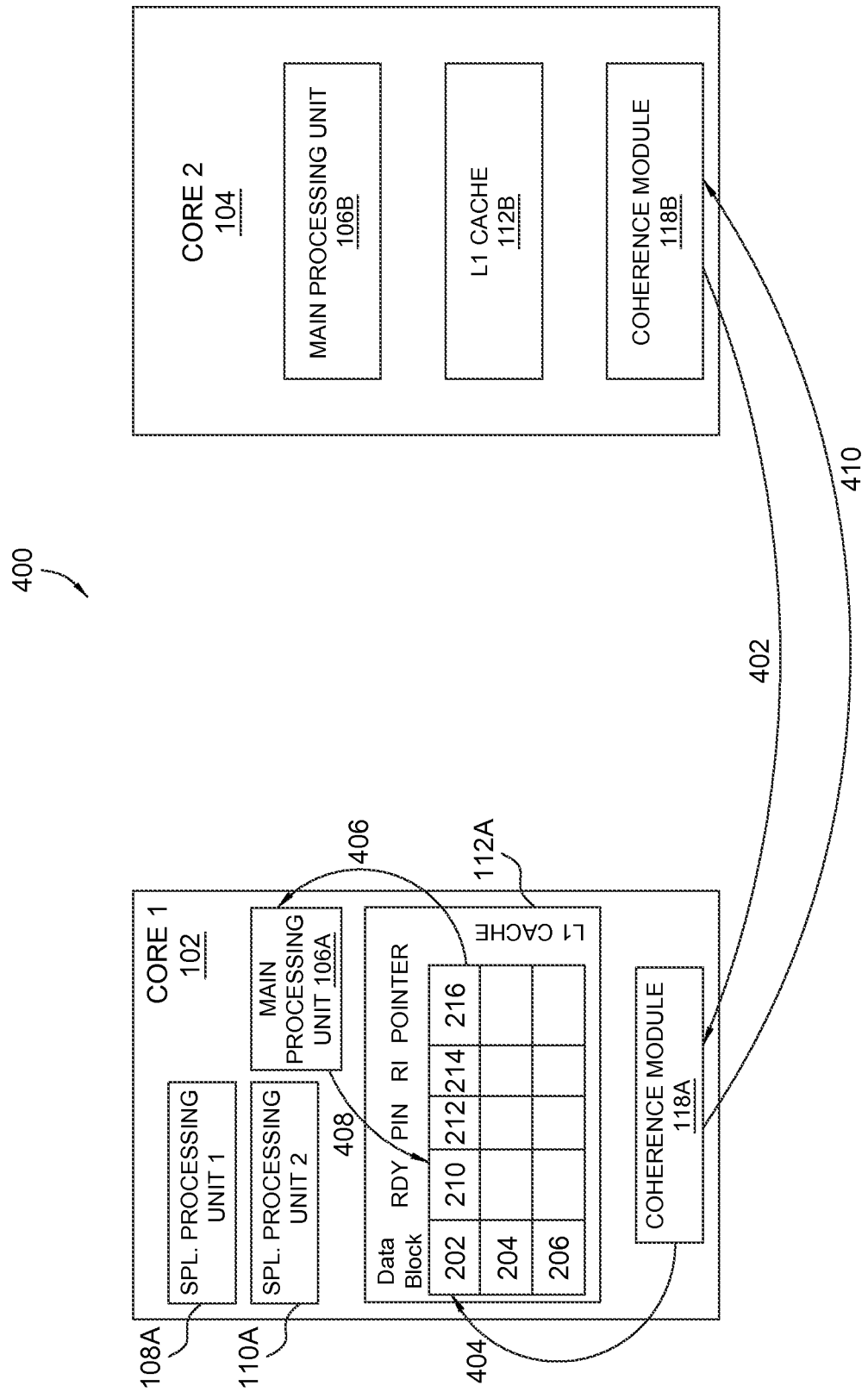
FIG. 4 is a block diagram illustrating an example implementation of data transfer across cores of a multi-core processor device.

FIG. 4 is a block diagram illustrating an example implementation 400 of data transfer across cores of a multi-core processor device, arranged in accordance with at least some embodiments described herein. As described before, the data blocks for execution of threads of a program may be distributed across private caches of multiple cores of a multi-core processor device (e.g., multi-core processor device 100 of FIG. 1). In some examples, the program may be a parallel program while in other examples the program may be a sequential program. As a thread is executed by a core (e.g., the second core 104) of the multi-core processor device (e.g., the multi-core processor device 100), the execution may generate a request for a data block. The cache coherence module (e.g., coherence module 118B) of the second core (e.g., core 104) may determine that the data block is cached by another core (e.g., the first core 102) of the multi-core processor device 100.

In one example, the first core 102 of the multi-core processor device 100 may be configured to receive a request (402) for a data block 202 from the second core 104 of the multi-core processor device 100. In this example the coherence module 118A of the first core 102 may be configured to receive the request for the data block 202 from the coherence module 118B of the second core 104, and the coherence module 118A may be configured to look up (404) the status of the data block 202 in the data tags associated with the data block 202. The coherence module 118A may be further configured to evaluate values of the ready (RDY) bit 210, the pinned (PIN) bit 212, and the respond-immediately (RI) bit 214 associated with the data block 202. In one example, the ready (RDY) bit 210 of the data is RESET (e.g., set to a value of "no" or logic 0, etc.) to indicate that a program-slice associated with the data block 202 may be executed. The program slice may be effective to update the data block 202.

Further, the pointer field 216 may be used by the coherence module 118A to extract the address of the associated program slice from the P-SAT 128. The address of the program slice extracted from the P-SAT 128 may be sent (406) to a processor unit, such as the main processor unit 106A, to initiate execution of the program slice. In one example, the program slice may be executed by a special processor unit (such as processor unit 108A) of the multi-core processor device 100 upon request from the main processor unit 106A. Upon execution of the program slice, the main processor unit 106A may set the ready (RDY) bit 210 of the data block 200 to indicate that the data block 200 is in a ready state (408). The coherence module 118A may subsequently send (410) the data block 202 to the coherence module 118B of the second core 104 in response to the request from the second core 104.

In some examples, the pinned (PIN) bit 212 is SET to (e.g., initialized to a value of "yes", logic 1, etc.) to indicate that the data block 202 is pinned to the L1 cache 112A of the first core 102. This indication may be utilized by the coherence module 118A to prevent migration of the data block 202 to another core such as the second core 104. In some examples, the respond-immediately (RI) bit 214 is SET (e.g., initialized to a value of "yes", logic 1, etc.) to indicate that the data block 202 may be transmitted to a requesting core, such as in response to a request from the second core 104. Alternately, when the respond-immediately (RI) bit 214 is RESET (e.g., initialized to a value of "no", logic 0, etc.), then the data block 200 may be sent to the requesting core upon completion of execution of an associated program slice.

The embodiments illustrated above describe data transfer process across cores such as the first core 102 and the second core 104 of the multi-core processor device 100. In certain embodiments, the proposed technique of data transfer across multiple cores may be used to facilitate coordination, synchronization, and data sharing across cores in the multi-core processor device 100. The present technique may be scalable for a large number of cores (e.g., N cores) of the multi-core processor device 100.

Figure 5A:
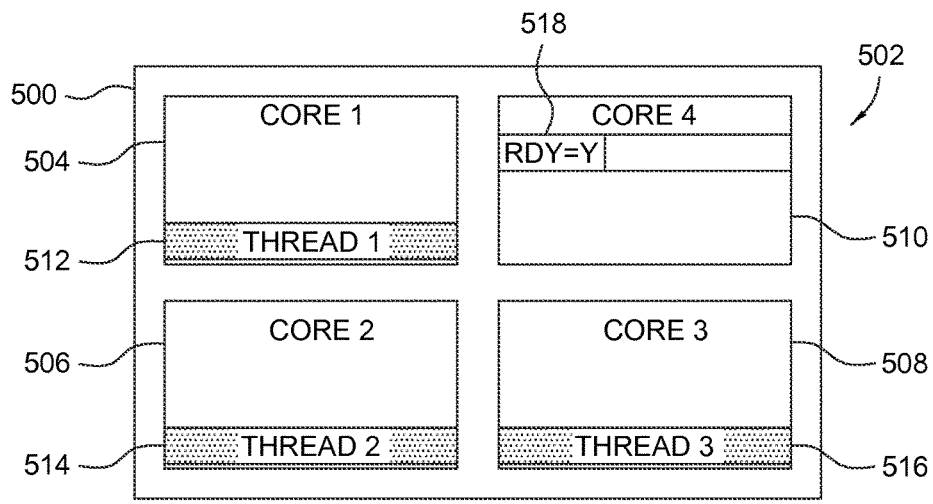
FIGS. 5A-5C illustrate example scenarios of implementation of mutual exclusion of threads in a multi-core processor device.
Figure 5B:
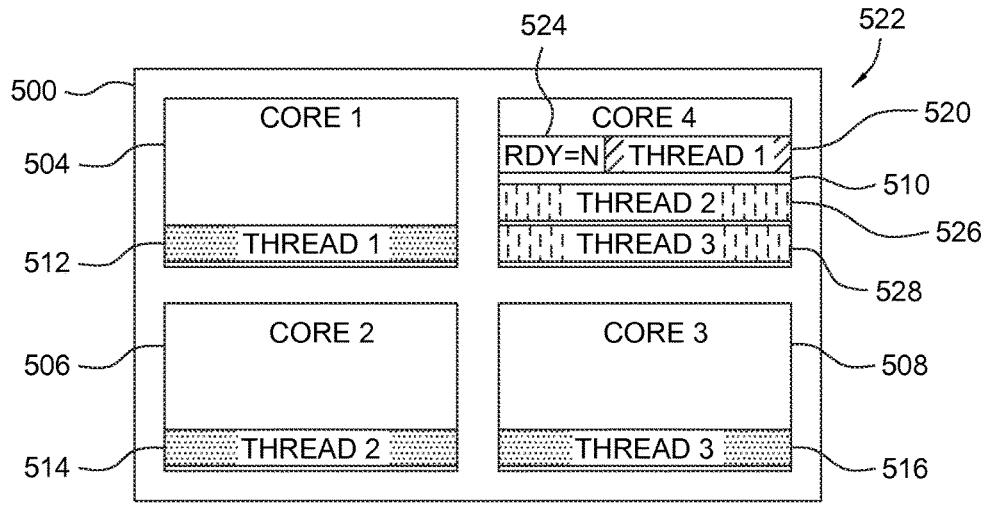
Figure 5C:
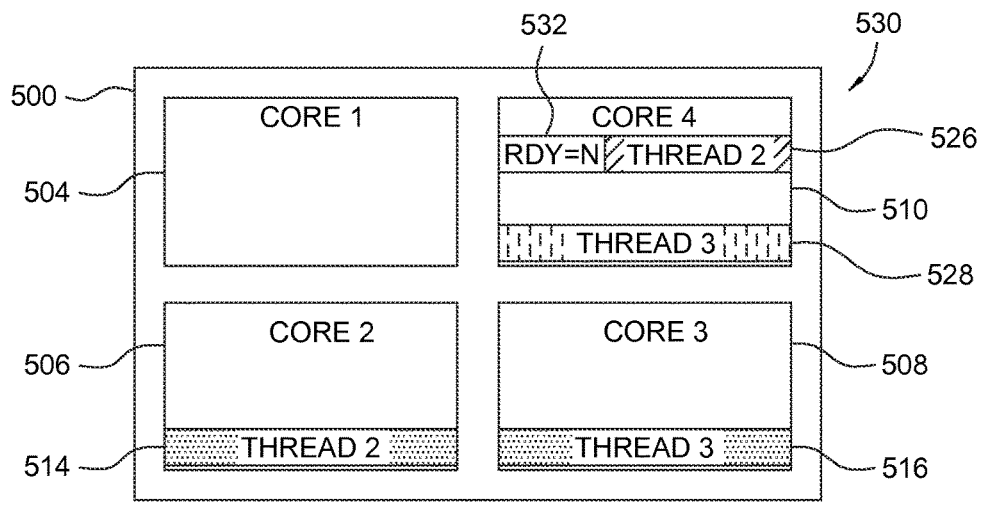

As described above, the present technique may be used to facilitate coordination, synchronization and data sharing across cores in multi-core processor devices. For example, the technique may be used to implement mutual exclusion (mutex) in multi-core processor devices. FIGS. 5A-5C illustrates example scenarios of implementation of mutual exclusion in a multi-core processor device, arranged in accordance with at least some embodiments described herein. As illustrated, the multi-core processor device 500 may include four cores generally represented by reference numerals 504, 506, 508 and 510.

In this example, FIG. 5A illustrates an initial state 502 of core 504, core 506, core 508 and core 510 of the multi-core processor device 500. Here, thread 1, thread 2 and thread 3, represented by reference numerals 512, 514, and 516 are under execution by a respective one of core 504, core 506 and core 508. In this example, a mutually exclusive (mutex) region may be identified within the core 510 that may be accessible by a single thread at a time while the other threads may be prevented from accessing the mutex region. In one example, thread 512 may initiate access to the mutually exclusive region in the core 510 and may initiate a request for a data block from a local cache of the core 510. Here, thread 512 may wait for a value to be returned in response to the request before initiating access to the mutually exclusive region.

When the requested data block is determined to be in a ready state (e.g., the ready (RDY) bit is SET with a value such as "yes", logic 1, etc.), as represented by reference numeral 518, a program slice associated with the data block may initiate recordation of the identity of the requesting thread 510 as represented by reference numeral 520 in the operational state 522 of the multi-core processor device 500, as illustrated in FIG. 5B. Further, the ready bit of the data block may be then RESET (e.g., the RDY bit is initialized to a value of "no", logic 0, etc.) as represented by reference numeral 524, to indicate that that some thread is already in the mutex region.

In some examples, a subsequent thread requesting the cache of the core 510 for a data block may not receive an immediate response to the request. For example, when the execution of other threads (such as threads 514 and 516) results in initiating a request while the first thread 512 is accessing the mutex region, the program slice may initiate recordation of their identities. The identities of the threads may be recorded as represented by reference numeral 526 and 528, which indicates the presence of the threads 514 and 516 waiting for access to the mutex region. A queue of threads that are waiting for access to the mutex region may be maintained as described above.

Referring now to FIG. 5C, as the first thread 512 releases access to the mutex region, the state of the data block may be updated to indicate that the mutex region may be accessed by other threads. Subsequently, the associated slice may respond to the second thread 514, allowing the thread 514 to now initiate access to the mutex region. Further, the ready bit of the data block may be then RESET (e.g., RDY may be initialized to a value of "no", logic 0, etc.) as represented by reference numeral 532, to indicate that the mutex region is being accessed by the thread 514.

In certain other examples, the techniques described herein may be used to implement synchronization in a multi-core processor device. For example, when a semaphore needs to be implemented to aid producer-consumer synchronization, the structure of the program slice that implements the producer-consumer synchronization may be similar to that of the mutex slice as described above.

In another example, a cache line/data block may be employed to function as a monitor of conflicting transactions in case of transactional memory. For example, a program slice associated with a cache line/data block may be executed by a processor to track various transactions and issues commits/aborts as appropriate. Here, a thread that initiates access to a transaction may initiate recordation of the thread identification to the cache line indicating the intent to access a transaction. The associated program slice may store a thread identification number in the data structure. Subsequently as the thread may write, the memory address accessed by LOAD and STORE operations within the transaction to the cache line, the associated program slice may store these memory addresses. Further, once a different thread accesses the cache line during the operation of the first transaction, the program slice may allow such access until there is a conflict with the first transaction. Upon a conflict, the slice may send an abort message to the later transaction.

The example techniques described herein may be used for operations such as coordination, synchronization and thread migration, etc. in multi-core processor devices. Further, the techniques may also facilitate distribution of sequential computation across multiple cores of the multi-core processor device. The example techniques may also be used to provide parallelism wherein the computation slices related to different memory locations are executed in parallel in such devices. Further, each instance of a static memory location may be held in a private cache of a different core and a new instance may be created by a write to a memory location.

As described above, the coordination and synchronization activities may be triggered dynamically during program execution. Such dynamic triggering may reduce or eliminate the need for the compiler and/or programmer to insert coordination and synchronization related information in a program.

Figure 6:
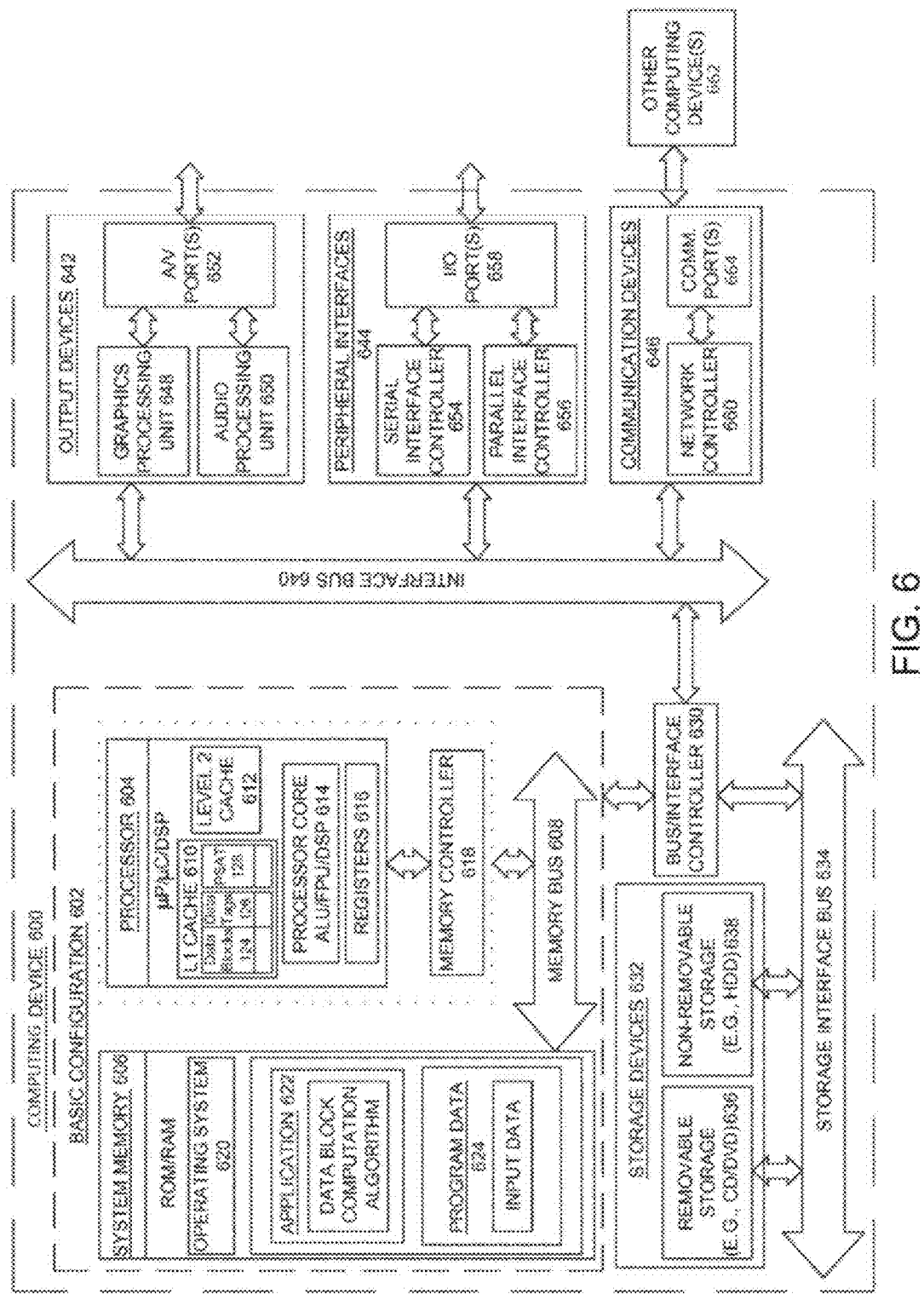
FIG. 6 is a block diagram illustrating an example computing device that is arranged for data transfer in a multi-core processor device.

FIG. 6 is a block diagram illustrating an example computing device 600 that is arranged for data transfer in a multi-core processor in accordance with at least some embodiments of the present disclosure. In a very basic configuration 602, the computing device 600 typically includes one or more processors 604 and a system memory 606. A memory bus 608 may be used for communicating between processor 604 and system memory 606. The processor 604 includes a multi-core processor.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one (L1) cache 610 and a level two cache 612, two or more processor cores 614, and registers 616. As described before, the L1 cache 610 may include a plurality of data tags 126 associated with data blocks 124 of the L1 cache 610. The data tags 126 can be indicative of a status of the data blocks 124. Examples of data tags 126 include, but are not limited to, a ready bit, a respond-immediately bit, a pinned bit, a pointer field, or combinations thereof.

During operation, as the processor 604 receives request for a data block 124, the data tags 126 may be evaluated to determine when the data block 124 is in a ready state. A program slice associated with the data block 124 may be identified when the data block is determined to be in an unavailable state. Further, the identified program slice may be executed by the processor core 614 to update the data block from the unavailable state to the ready state and the data block may be subsequently sent to the requesting core.

An example processor core 614 may include an arithmetic logic unit (ALU), a floating point unit (FPU), a digital signal processor core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some embodiments, application 622 may be arranged to operate with program data 624 on operating system 620. This described basic configuration 602 is illustrated in FIG. 6 by those components within the inner dashed line. Application 622 may include algorithm for executing one or more program slices to update state of data blocks 124 to a ready state. For example, the application 622 may include algorithm for computing the values of data blocks 124. Program data 624 may include input data that may be accessed for execution of one or more program slices associated with the data blocks 124.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof.

Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processor unit 648 and an audio processor unit 650, which may be configured to communicate to various external devices such as a display or speakers via one or more A/V ports 652.

Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that when a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even when a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B".

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for data transfer in a multi-core processor device, the method comprising:
   receiving, by a first core of the multi-core processor device, a request for a data block, wherein the data block is stored in a private cache of the first core, and wherein receiving the request for the data block includes receiving a first request from a second core of the multi-core processor device;
   evaluating the data block stored in the private cache to determine whether the stored data block is in a ready state;
   receiving, from the second core, a second request for the data block;
   incrementing a counter associated with the data block after the data block is determined to be in an unavailable state;
   identifying a dynamic program slice associated with the data block in response to the determination that the stored data block is in the unavailable state, wherein the dynamic program slice is identified during an execution of a program that includes the dynamic program slice;
   executing the identified dynamic program slice by the first core effective to update the stored data block from the unavailable state to the ready state;
   determining whether the stored data block is in the ready state after the execution of the identified dynamic program slice;
   sending the data block to an interconnect network after the stored data block is determined to be in the ready state; and
   processing the second request after the data block is determined to be in the ready state.

2. The method of claim 1, wherein sending the data block comprises sending the data block from the private cache of the first core to a private cache of the second core.

3. The method of claim 1, wherein evaluating the data block stored in the private cache comprises evaluating a value of a ready bit associated with the data block stored in the private cache.

4. The method of claim 1, wherein identifying the dynamic program slice comprises evaluating a pointer field associated with the data block stored in the private cache.

5. The method of claim 1, wherein executing the identified dynamic program slice comprises executing one or more instructions that correspond to the identified dynamic program slice.

6. The method of claim 1, further comprising:
   evaluating a value of a respond-immediately bit associated with the stored data block, wherein sending the data block includes:
   sending the data block from the private cache of the first care to the interconnect network after completion of the execution of the identified dynamic program slice after the respond-immediately bit is reset.

7. The method of claim 1, wherein executing the identified dynamic program slice comprises updating the data block by performing one or more of: data block computation, data block fetch, data coordination, and data synchronization operations.

8. The method of claim 1, further comprising:
   evaluating a value of a pinned bit associated with the data block to determine whether the pinned bit is set; and
   preventing eviction of the data block from the private cache of the first core in response to the pinned bit being determined to be set.

9. A multi-core processor device, comprising:
   a first core configured to:
      receive, from a second core of the multi-core processor device, a first request for a data block,
      receive, from the second core, a second request for the data block, wherein the first core is further configured to increment a counter associated with the data block after the data block is determined to be in an unavailable state;
      wherein the first core comprises a private cache and a coherence module, and wherein:
         the private cache is configured to store the data block,
         the coherence module is configured to determine whether the data block stored in the private cache is in a ready state, and
         the coherence module is further configured to identify a dynamic program slice associated with the data block after the data block is determined to be in the unavailable state, wherein the dynamic program slice is identified during an execution of a program that includes the dynamic program slice; and
      one or more processor units coupled to the coherence module and configured to execute the identified dynamic program slice to update the data block from the unavailable state to the ready state.

10. The multi-core processor device of claim 9, wherein the second core is coupled to the first core and is configured to receive the data block after the execution of the identified dynamic program slice.

11. The multi-core processor device of claim 9, wherein the private cache of the first core comprises tags associated with the data block stored in the private cache of the first core.

12. The multi-core processor device of claim 9, wherein the private cache of the first core comprises one or more of:

a ready bit, a respond-immediately bit, a pinned bit, and a pointer field associated with the data block.

13. The multi-core processor device of claim 9, wherein the first core is configured to maintain a program slice address table (P-SAT) configured to store addresses of dynamic program slices.

14. The multi-core processor device of claim 13, wherein the program slice address table (P-SAT) is stored in the private cache of the first core.

15. The multi-core processor device of claim 13, wherein the coherence module is configured to identify the dynamic program slice associated with the data block, from the program slice address table (P-SAT) based upon a pointer field associated with the data block.

16. A method for data transfer in a multi-core processor device, the method comprising:
   receiving, by a first core of the multi-core processor device, a request for a data block, wherein the data block is stored in a private cache of the first core, and wherein receiving the request for the data block includes receiving a first request from a second core of the multi-core processor device;
   evaluating a ready bit associated with the data block to determine whether the data block in the private cache is in a ready state;
   receiving, from the second core, a second request for the data block;
   incrementing a counter associated with the data block after the data block is determined to be in an unavailable state;
   identifying a dynamic program slice by evaluating a pointer field associated with the data block in response to the determination that the data block is in the unavailable state, wherein the dynamic program slice is identified during an execution of a program that includes the dynamic program slice;
   executing the identified dynamic program slice, by the first core, effective to update the data block from the unavailable state to the ready state;
   determining whether the stored data block is in the ready state after the execution of the identified dynamic program slice;
   sending the data block to the second core after the stored data block is determined to be in the ready state; and
   processing the second request after the data block is determined to be in the ready state.

17. The method of claim 16, further comprising:
   evaluating a value of a respond-immediately bit associated with the data block, wherein sending the data block includes:
   sending the data block to a private cache of the second core after completion of the execution of the identified dynamic program slice after the respond-immediately bit is reset.

18. The method of claim 16, further comprising:
   evaluating a value of a pinned bit associated with the data block; and
   preventing eviction of the data block from the private cache of the first core when the pinned bit is set.

* * * * *

UNITED STATES PATENT AND TRADEMARK OFFICE
CERTIFICATE OF CORRECTION

| | | |
|---|---|---|
| PATENT NO. | : 9,864,709 B2 | Page 1 of 4 |
| APPLICATION NO. | : 14/383895 | |
| DATED | : January 9, 2018 | |
| INVENTOR(S) | : Vajapeyam | |

It is certified that error appears in the above-identified patent and that said Letters Patent is hereby corrected as shown below:

In Fig. 6, Sheet 6 of 6, for Tag "640" Line 1, delete "OUTPUT DEVICES 640" and insert -- OUTPUT DEVICES 642 --, therefor. (See attached Sheet)

In Fig. 6, Sheet 6 of 6, for Tag "644" Lines 1-3, delete "GRAPHICS PROCESSING UNIT 644" and insert -- GRAPHICS PROCESSING UNIT 648 --, therefor.

In Fig. 6, Sheet 6 of 6, for Tag "646" Lines 1-3, delete "AUDIO PROCESSING UNIT 646" and insert -- AUDIO PROCESSING UNIT 650 --, therefor.

In Fig. 6, Sheet 6 of 6, for Tag "642" Lines 1-3, delete "A/V PORT(S) 642" and insert -- A/V PORT(S) 652 --, therefor.

In Fig. 6, Sheet 6 of 6, for Tag "648" Lines 1-2, delete "PERIPHERAL INTERFACES 648" and insert -- PERIPHERAL INTERFACES 644 --, therefor.

In Fig. 6, Sheet 6 of 6, for Tag "650" Lines 1-4, delete "SERIAL INTERFACE CONTROLLER 650" and insert -- SERIAL INTERFACE CONTROLLER 654 --, therefor.

In Fig. 6, Sheet 6 of 6, for Tag "652" Lines 1-4, delete "PARALLEL INTERFACE CONTROLLER 652" and insert -- PARALLEL INTERFACE CONTROLLER 656 --, therefor.

In Fig. 6, Sheet 6 of 6, for Tag "648" Lines 1-3, delete "I/O PORT(S) 648" and insert -- I/O PORT(S) 658 --, therefor.

In Fig. 6, Sheet 6 of 6, for Tag "660" Lines 1-2, delete "COMMUNICATION DEVICES 660" and insert -- COMMUNICATION DEVICES 646 --, therefor.

In Fig. 6, Sheet 6 of 6, for Tag "654" Lines 1-3, delete "NETWORK CONTROLLER 654" and insert -- NETWORK CONTROLLER 660 --, therefor.

Signed and Sealed this
Twenty-fourth Day of April, 2018

Andrei Iancu
*Director of the United States Patent and Trademark Office*

In Fig. 6, Sheet 6 of 6, for Tag "656" Lines 1-3, delete "COMM. PORT(S) 656" and insert -- COMM. PORT(S) 664 --, therefor.

In Fig. 6, Sheet 6 of 6, for Tag "658" Lines 1-4, delete "OTHER COMPUTING DEVICE(S) 658" and insert -- OTHER COMPUTING DEVICE(S) 662 --, therefor.

In Fig. 6, Sheet 6 of 6, for Tag "638" Line 1, delete "INTERFACE/BUS 638" and insert -- INTERFACE BUS 40 --, therefor.

In Fig. 6, Sheet 6 of 6, for Tag "600" Line 1, delete "COMPUTER DEVICE 600" and insert -- COMPUTING DEVICE 600 --, therefor.

In Fig. 6, Sheet 6 of 6, for Tag "634" Lines 1-3, delete "REMOVABLE STORAGE_(E.G., CD/DVD) 634" and insert -- REMOVABLE STORAGE (E.G., CD/DVD) 636 --, therefor.

In Fig. 6, Sheet 6 of 6, for Tag "636" Lines 1-3, delete "NON-REMOVABLE STORAGE (E.G., HDD) 636" and insert -- NON-REMOVABLE STORAGE (E.G., HDD) 638 --, therefor.

In Fig. 6, Sheet 6 of 6, for Tag "638" Line 1, delete "STORAGE INTERFACE BUS 638" and insert -- STORAGE INTERFACE BUS 634 --, therefor.

In Column 1, Line 7, delete "is U.S." and insert -- is a U.S. --, therefor.

In Column 1, Line 11, delete "Filed" and insert -- filed --, therefor.

In Column 1, Lines 15-18, delete "Unless....section." and insert -- BACKGROUND Unless......section --, therefor.

In Column 2, Line 62, delete "device:" and insert -- device; --, therefor.

In Column 3, Line 9, delete "device;" and insert -- device, --, therefor.

In Column 5, Line 10, delete "of a execution" and insert -- of an execution --, therefor.

In Column 5, Line 21, delete "processor 100." and insert -- processor device 100. --, therefor.

In Column 9, Line 50, delete "of"no" or" and insert -- of "no" or --, therefor.

In Column 10, Line 14, delete "of"no"," and insert -- of "no", --, therefor.

In Column 10, Line 63, delete "that that some" and insert -- that some --, therefor.

In Column 11, Line 37, delete "Subsequently as" and insert -- Subsequently, as --, therefor.

In Column 12, Line 10, delete "one more" and insert -- one or more --, therefor.

CERTIFICATE OF CORRECTION (continued)

U.S. Pat. No. 9,864,709 B2

In Column 12, Line 32, delete "implementations memory" and insert -- implementations, memory --, therefor.

In Column 13, Line 21, delete "graphics processor unit 648" and insert -- graphics processing unit 648 --, therefor.

In Column 14, Line 28, delete "recitation no" and insert -- recitation, no --, therefor.

In Column 14, Line 50, delete "general such" and insert -- general, such --, therefor.

In Column 14, Line 58, delete "general such" and insert -- general, such --, therefor.

In Column 16, Line 13, in Claim 6, delete "hit" and insert -- bit --, therefor.

In Column 16, Line 17, in Claim 6, delete "care" and insert -- core --, therefor.